UNITED STATES PATENT OFFICE 2,438,090

DIALKOXY PROPIONITRILES

Albert M. Clifford, Stow, and Joy G. Lichty, Cuyahoga Falls, Ohio, assignors to Wingfoot Corporation, Akron, Ohio, a corporation of Delaware No Drawing. Application August 26, 1944, Serial No. 551,428

4 Claims. (Cl. 260—464)

This invention relates to new substituted propionitriles and to a method of preparing the same. More particularly, it relates to the alpha beta dialkoxy propionitriles and the preparation thereof.

The compounds to which the present invention relates have the general formula:

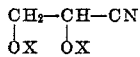

where X is a radical, preferably an alkyl radical but which may be aralkyl and alicyclic. Especially desirable compounds are those in which X is a radical having from one to four carbon atoms.

Our new compounds may be prepared by reacting an alcohol with an alpha beta dihalo propionitrile, the latter sometimes carrying additional alkyl substituents. Preferably the dichloro compounds are employed as intermediates, but there may also be employed other dihalo propionitriles, such as dibromo propionitriles. The reaction is effected by means of a reagent selected from the group consisting of the alkali metals and the alkali metal hydroxides. Of these, sodium metal is preferred, although it will be understood that the sodium reacts with the alcohol present to form a sodium alcoholate and promotion of the reaction by the use of an alkali metal alcoholate is considered an equivalent of the addition of the alkali metal to the alcohol-nitrile reaction mixture. The procedure is illustrated by the reaction of methyl alcohol and dichloropropionitrile in the presence of sodium hydroxide to give alpha, beta-dimethoxy-isobutyronitrile in accordance with the following equation:

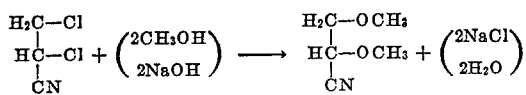

The new compounds may be produced by an alternative procedure in which an alpha-halo-acrylonitrile is reacted with an alcohol under similar conditions.

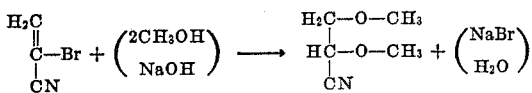

By either procedure the result is a propionitrile carrying an aliphatic oxy, preferably an alkoxy substituent, in both the alpha and the beta positions.

The invention is illustrated by the following example, but it will be understood that the invention is not limited to the details shown.

Example 1

A methanol solution of sodium methylate was prepared by adding 20.2 grams of sodium to 175 cc. of methanol. This solution was added to 116 grams of alpha bromacrylonitrile with stirring and sufficient cooling to prevent too rapid refluxing. After all was added the product was heated for 20 minutes, then cooled and the sodium bromide filtered out. Distillation of the methanol caused more salt to separate. This was also filtered out. Continued distillation gave a product boiling at 96–101° C./36 mm. This product was identified by analysis as dimethoxypropionitrile.

Other substituted propionitriles can be prepared in accordance with the foregoing disclosure. We intend to include as part of our invention the alkyloxy, the aralkyloxy, and the alicyclic oxy substituents, but compounds containing alkoxy substituents constitute the preferred form of the invention. The method may be applied to bring about the reaction of an alcohol in the presence of sodium or of sodium alcoholate or one of the other catalysts disclosed, with alpha, beta-dichlorpropionitrile, alpha, beta-dichloro-isobutyronitrile, alpha, beta-dibromoisobutyronitrile, or with a mono halo acrylonitrile, such as alpha-chloroacrylonitrile, alpha-bromoacrylonitrile, alpha - chloro-beta-ethyl-acrylonitrile and similar propionitriles and acrylonitriles.

Any of the foregoing nitriles and others may be reacted with any of the following alcohols, for example: methyl, ethyl, propyl, butyl, isopropyl, isobutyl, amyl, octyl, cyclohexyl and tetrahydrofurfuryl.

By the practice of the invention the following compounds, as well as others, may be prepared: diethoxy - propionitrile, diisopropoxy - propionitrile, di-n-butoxy-propionitrile, di-isobutoxy-propionitrile, dicyclohexoxy-propionitrile, ditetrahydrofurfuroxy-propionitrile.

In the reaction of alcohols with alpha, beta-dichloro-propionitrile, one may use either the sodium alcoholate or a solution of NaOH or KOH in the lower alcohols. However, with propyl and higher alcohols the preparation of the sodium or potassium alcoholate is much preferred over the solution of the alkali in the alcohol. In this reaction of a dichloro compound with an alcoholate, the latter is used in the ratio of two mols to one of the chloro compound. If the reaction is with an alpha-chloroacrylonitrile, then the alcoholate and the chloro compound are used in substantially equal molecular ratios.

In distilling the product after the addition of the alcohol to the nitrile it is found advantageous to make the solution acidic to litmus. The reason for this precaution is that the reaction is reversible and, in the presence of alkali, distillation may result in the loss of alcohol from the compound, giving an unsaturated compound.

This new group of ether nitriles is useful as solvents and as intermediates in the preparation of useful acids, esters and amines. The esters, prepared from the nitriles by hydrolysis and subsequent esterification, are valuable plasticizers for synthetic resins. The amines, prepared by reduction of the nitriles, are useful as rubber accelerators and antioxidants.

This application is a continuation-in-part of Serial No. 387,918, filed by us on April 10, 1941, now abandoned.

While there have been described above the preferred embodiments of the invention, it will be apparent to those skilled in the art that various modifications and changes may be made therein without departing from the spirit of the invention or from the scope of the appended claims.

We claim:
1. Alpha beta dimethoxy propionitrile.
2. Alpha beta diethoxy propionitrile.
3. Alpha beta dipropoxy propionitrile.
4. A compound having the molecular structure

$$\underset{OR\phantom{xx}OR}{CH_2-CH-CN}$$

wherein R is a lower alkyl radical.

ALBERT M. CLIFFORD.
JOY G. LICHTY.

REFERENCES CITED

The following references are of record in the file of this patent:

UNITED STATES PATENTS

| Number | Name | Date |
|---|---|---|
| 2,073,363 | Carothers et al. | Mar. 9, 1937 |
| 2,129,694 | Izard | Sept. 13, 1938 |